(12) United States Patent
Turner et al.

(10) Patent No.: US 7,305,103 B2
(45) Date of Patent: Dec. 4, 2007

(54) SYSTEM AND METHOD FOR GENERATING PAN SHARPENED MULTISPECTRAL IMAGERY

(75) Inventors: Robert W. Turner, Federal Way, WA (US); Pauline Joe, Renton, WA (US); James J. Rustik, Kent, WA (US); Ingrid L. Criswell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 937 days.

(21) Appl. No.: 10/611,757

(22) Filed: Jun. 30, 2003

(65) Prior Publication Data

US 2004/0264796 A1   Dec. 30, 2004

(51) Int. Cl.
*G06K 9/00*   (2006.01)
(52) U.S. Cl. .................. 382/100; 382/191; 382/254; 348/33
(58) Field of Classification Search ............... 382/100, 382/167, 190, 191, 192, 194, 195, 254, 263, 382/274, 276; 348/33; 455/168.1, 176.1, 455/180.1, 188.1; 430/503, 505, 507, 511, 430/570, 926; 374/121, 124, 168, 169
See application file for complete search history.

(56) References Cited

U.S. PATENT DOCUMENTS

| | | | | |
|---|---|---|---|---|
| 4,313,678 A | * | 2/1982 | Colvocoresses | 356/2 |
| 4,683,496 A | * | 7/1987 | Tom | 348/625 |
| 4,864,127 A | | 9/1989 | Brame | |
| 5,949,914 A | * | 9/1999 | Yuen | 382/254 |
| 6,741,740 B2 | * | 5/2004 | Sunshine et al. | 382/191 |
| 6,937,774 B1 | * | 8/2005 | Specht et al. | 382/254 |

\* cited by examiner

*Primary Examiner*—Samir Ahmed
*Assistant Examiner*—Abolfazl Tabatabai
(74) *Attorney, Agent, or Firm*—Lee & Hayes, PLLC

(57) ABSTRACT

A system, method, and computer program product are provided for sharpening bands of sensor data in the visual spectrum. Blue, green, red, near-infrared, and panchromatic bands of data are received. Data of the panchromatic band is corrected based on the blue, green, red, and near-infrared bands of data, and the data of one or more of the green, red, and near-infrared bands is sharpened based on the corrected data of the panchromatic band. The sharpened data of the green, red, and near-infrared bands is combined with the received panchromatic band of data and then displayed.

33 Claims, 6 Drawing Sheets

SYSTEM AND METHOD FOR GENERATING PAN SHARPENED MULTISPECTRAL IMAGERY

This application is copending with U.S. patent application Ser. No. 10/611,702, and U.S. patent application Ser. No. 10/611.703, all filed Jun. 30, 2006 and all are hereby incorporated by reference.

FIELD OF THE INVENTION

The present invention relates to image processing and, particularly multispectral imaging, and more particularly, to sharpening of images in the visual spectrum, especially those generated by airborne or satellite platforms.

BACKGROUND OF THE INVENTION

Various systems exist for producing remotely sensed data for agriculture and other applications where it is desired to detect changes over time in an image area. One such sensing system is the Systeme Pour l'observation de la Terre (SPOT) satellite developed by the French Centre National d'Etudes Spatiales (CNES). The SPOT satellite produces red, green, blue, and near-infrared color bands to a resolution of approximately 10 meters. For many uses, such as agriculture and other change detection applications, data produced by the SPOT satellite meets various radiometric and temporal frequency requirements. However, this data is expensive. For example, a 60 km×60 km image costs approximately 2,000.

Another remote sensing system is a Land Remote Sensing Satellite Program (LANDSAT-7) satellite operated by NASA. The LANDSAT-7 satellite produces a single frame/array of a 180 km×180 km image with red, green, blue, and near-infrared color bands at a resolution of about 25 meters and a panchromatic band that includes green, red, and near-infrared wavelengths at a resolution of 12.5 meters. A LANDSAT-7 image costs roughly 500 with a resulting cost and coverage benefit of 36. The data from the LANDSAT series satellite is attractive because of its affordable cost. However, the images produced by the LANDSAT series satellites do not have the multispectral spatial resolution necessary to produce high value agricultural or change detection information products.

In order to overcome the low multispectral spatial resolution of the LANDSAT series satellite images, sharpening techniques have been introduced for increasing the resolution of images produced from the raw data generated by the LANDSAT series satellite. However, the images produced by these sharpening techniques lose some of the radiometric accuracy of the raw data, thereby reducing the value of the information produced.

Therefore, there exists an unmet need in the art for increasing resolution of low cost data from remote sensing systems while preserving radiometric accuracy for effective use in agriculture and other change detection information products.

SUMMARY OF THE INVENTION

The present invention provides a system, method, and computer program product for increasing resolution of low cost data from remote sensing systems while preserving radiometric accuracy for more highly effective use in agriculture and other change detection information products. Radiometrics is the detection and measurement of radiant electromagnetic energy.

Embodiments of the present invention sharpen bands of sensor data in the visual spectrum. Blue, green, red, near-infrared, and panchromatic (pan) bands of data are received. Data of the pan band is corrected based on the blue, green, red, and near-infrared bands of data, and the data of one or more of the green, red, and near-infrared bands is sharpened based on the corrected data of the pan band. This technique can be applied to other multispectral bands covered by a pan band for the radiation region of interest, such as short wavelength infrared (SWIR), medium wavelength infrared (MWIR), or long wavelength infrared.

In one aspect of the invention, the sharpened data of the green, red, and near-infrared bands is combined with the received pan band of data and then displayed.

In another aspect of the invention, the data suitably is corrected by converting the received blue, green, red, near-infrared, and pan bands of data to power-format, sharpening the converted power-formatted data of the green, red, and near-infrared bands based on the received pan band of data, and correcting the power-formatted data of the pan band based on sharpened power values for the data of the green, red, and near-infrared bands.

In a further aspect of the invention, the data of the blue, green, red, and near-infrared bands may be resized in order to match the resolution of the data of the pan band prior to converting it to the power-format.

In yet another aspect of the invention, the corrected pan band power suitably is subtracted from original pan band power to form a new band that covers red edge of vegetation.

In still yet another aspect of the invention, the blue, green, red, near-infrared, and pan bands of data are generated by one of an aircraft or satellite sensing system as desired.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention provides a system, method, and computer program product for pan sharpening remotely sensed data, such as without limitation, LANDSAT series satellite data. The present invention performs power corrections and sharpening algorithms to the remotely sensed data in order to preserve spectral and spatial characteristics and features within an area of interest.

Figure 1:
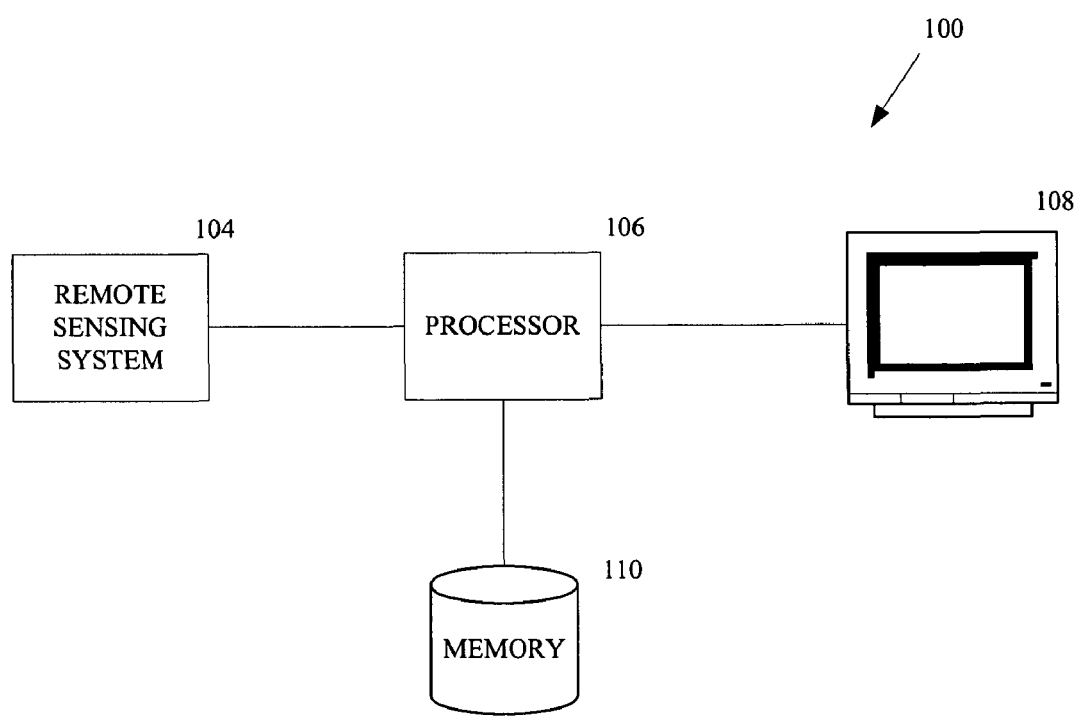
FIG. 1 is a block diagram of an exemplary system formed in accordance with an embodiment of the present invention.

FIG. 1 illustrates an exemplary system 100 that performs the pan sharpening of remotely sensed data. The system 100 includes a remote sensing system 104, a processor 106, a display device 108, and memory 110. The remote sensing system 104 senses data that includes a blue band, a red band, a green band, a near-infrared (NIR) band, and a panchromatic (pan) band. The pan band includes wavelengths of light that include green, red, and NIR. The sensed data is sent to the processor 106, which sharpens the received data and makes it available for display on the display device 108 as described below. It will be appreciated that the process performed by the system 100 can be applied to other sets of bands that have pan bands which span the set of bands to be sharpened.

Figure 2:
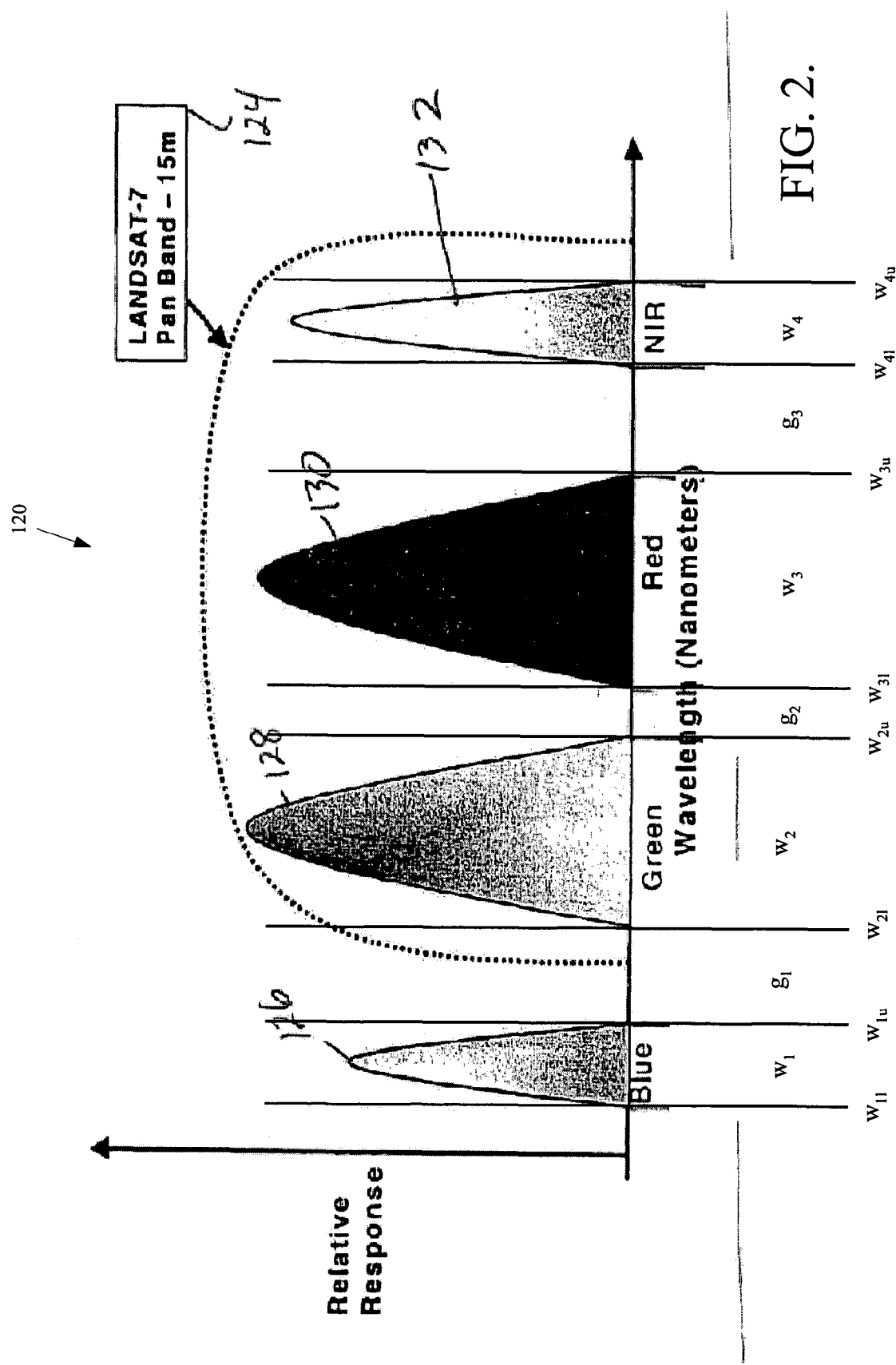
FIG. 2 is an example of raw multi-spectrum data produced by a component of the system shown in FIG. 1.

FIG. 2 illustrates exemplary data 120 produced by the remote sensing system 104 (FIG. 1). In one embodiment of the present invention, the remote sensing system 104 is a LANDSAT-7 satellite that produces a pan band 124 at a resolution of 15 meters. The LANDSAT-7 also senses data in a blue band 126, a green band 128, a red band 130, and a NIR band 132 at a resolution of 30 meters. Each of the color bands 126-132 are defined by width values $w_1$, $w_2$, $w_3$, and $w_4$ respectively, and are separated by gaps $g_1$, $g_2$, and $g_3$, respectively. Other satellites that may also be used are Ikonos or EO-1 with an ALI sensor.

Figure 3:
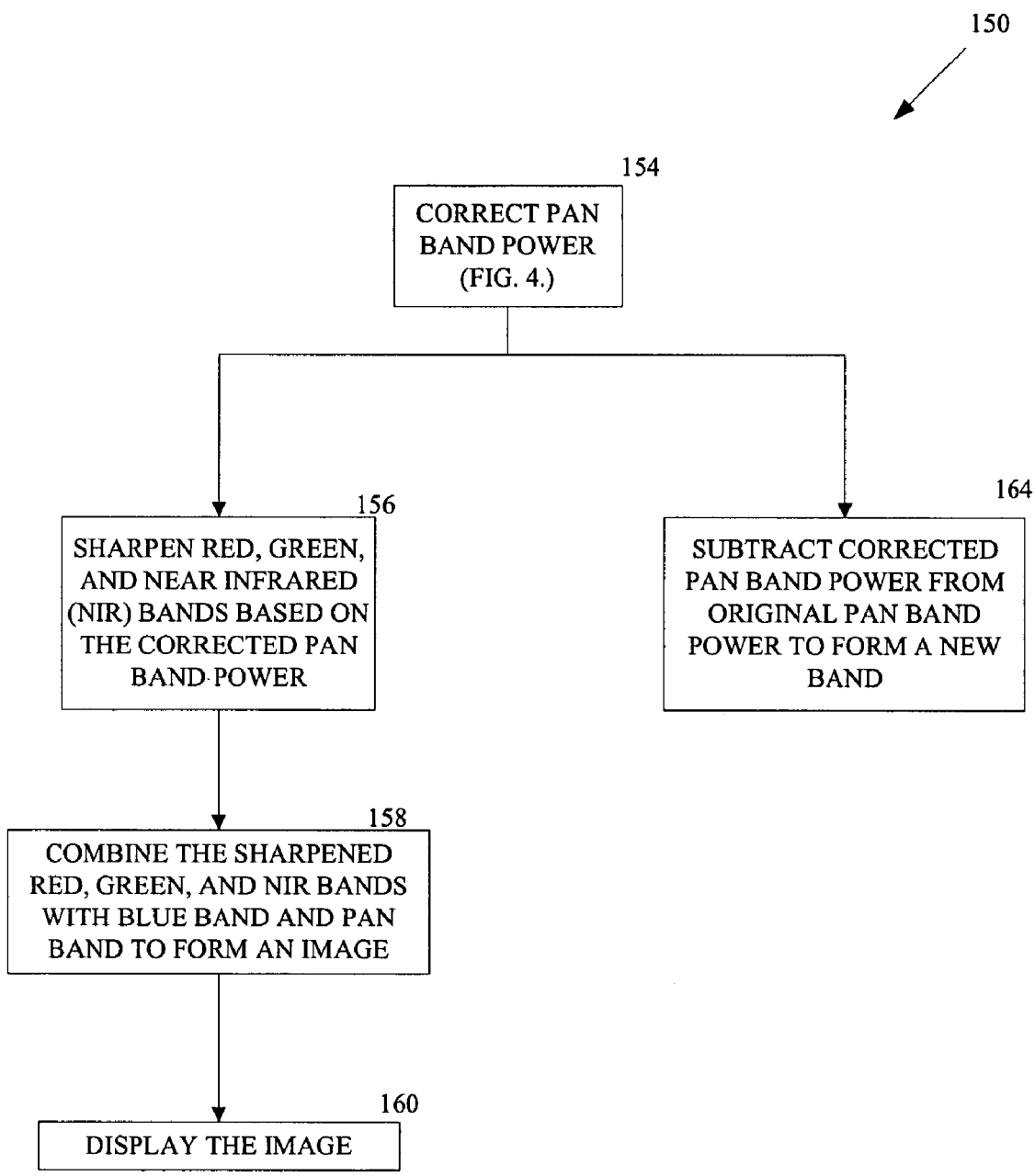
FIGS. 3 and 4 show a flow diagram of an exemplary process performed by the system shown in FIG. 1.

FIG. 3 illustrates a non-limiting, exemplary process 150 performed by the system 100 (FIG. 1). At a block 154, the pan band power of sensed pan band data is corrected. The sensed data is suitably a plurality of data units arranged in an array of data units. Each unit in the array has a power value that is being corrected in the block 154. Correction of the pan band power is described in more detail below in FIG. 4. At a block 156, sensed data of the red, green, and NIR bands are sharpened based on the corrected pan band power. The sensed data of the green, red, and NIR bands are arrays of data units having a plurality of units of data. Each unit of data in the arrays is being sharpened at the block 156. At a block 158, the sharpened data of the red, green, and NIR bands are combined with the blue band and pan band to form an image. At a block 160, the image of the combined bands is displayed on the display device 108. At a block 164, the corrected pan band power is subtracted from the original pan band power to form a new band. The new band falls on the red edge of the vegetation spectrum. Changes that occur in this band can indicate various stresses on the vegetation including water stress.

Figure 4:
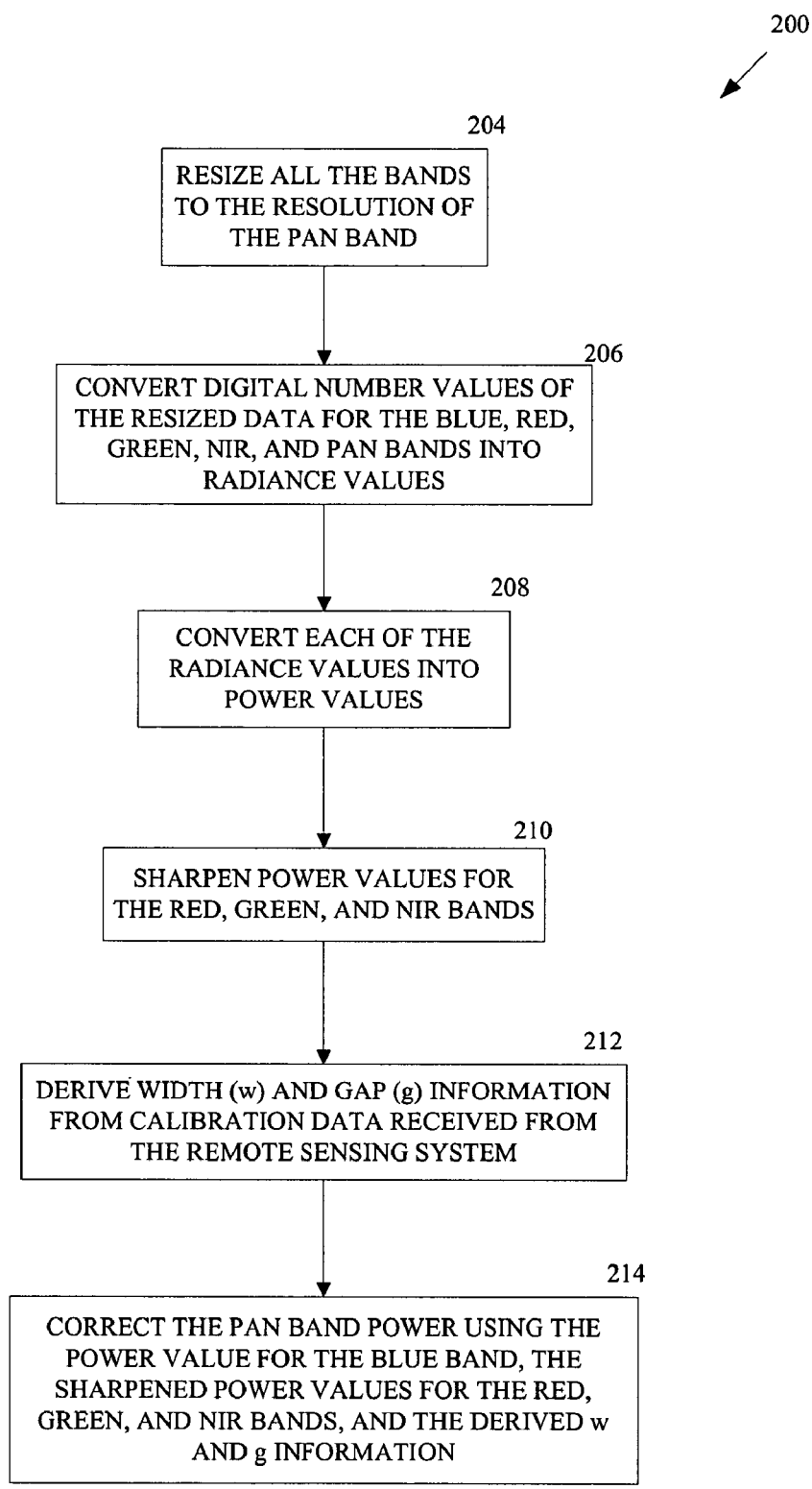

FIG. 4 illustrates a non-limiting, exemplary process 200 for correcting the pan band power performed at the block 154 (FIG. 3). At a block 204, the arrays of the blue, red, green, and NIR bands are resized to the resolution of the pan band. For example, the LANDSAT-7 satellite produces a data array of the pan band at a resolution of 15 meters, and data arrays of the blue, green, red, and NIR bands at 30 meters. The sensed data in each unit in the arrays are in digital number format. Each digital number of a unit for the blue, green, red, and NIR bands is divided into four subunits with each subunit having the same digital number value as the original unit. Other interpolation processes can be used to perform this rescaling process. As a result, each of the subunits is now at a resolution of 15 meters. At a block 206, the digital number of values of the resized data for the blue, green, red, and NIR bands, and the data for the pan band are converted into radiance values. EQUATION (1) below shows an example formula for generating radiance values using calibration coefficients.

$$L_T = \frac{(LMAX_T - LMAX_T)}{(qcal\max - qcal\min)} \times (qcal - qcal\min) + LMIN_T \quad (1)$$

where
$L_T$=spectral radiance in watts/(meter²*sr*micron)
QCAL=quantized calibrated frame unit value in digital number (DN) format
QCALMIN=minimized quantized calibrated frame unit value in DN format
QCALMAX=maximum quantized calibrated frame unit value in DN format
$LMIN_T$=spectral radiance that is scaled to QCALMIN in watts/(meter²*sr*micron)
$LMAX_T$=spectral radiance that is scaled to QCALMIN in watts/(meter²*sr*micron)

At a block 208, each of the radiance values are converted into power values. EQUATION (2) below illustrates an exemplary formula for generating a power value from the radiance value.

$$P = Rad. \cdot (w_u - w_l) \quad (2)$$

where
$w_u$=Upper width limit of associated band; and
$w_l$=Lower width limit of associated band.
Rad=Radiance in band (this corresponds to $L_T$)

The difference of the upper and lower width limits $w_u$ and $w_l$ for a band is multiplied by the radiance value to generate the power value. The upper and lower width limits $w_u$ and $w_l$ are determined by analysis of the spectral response of the respective band.

At a block 210, the power values for each resized unit (subunit) of the red, green, and NIR band are sharpened. EQUATION (3) below illustrates an example of a power sharpening formula that determines a fraction of a power value $P_n$ in a unit in a band (green, red, or NIR) relative to the sum of the power of all the bands (green, red, and NIR) $P_{green} + P_{red} + P_{NIR}$ and multiplies the fraction by the original pan band power to generate a sharpened power value $P_S$ for the unit.

$$P_s = \text{Original } Pan \text{ Band Power} \times \frac{P_n}{P_{green} + P_{red} + P_{NIR}} \quad (3)$$

For example, a power value for one of the units for the green band is divided by the sum of the power values in the corresponding unit for the green, red, and NIR bands. This fraction is multiplied by the original pan band power value for the corresponding unit in order to produce a sharpened power value $P_s$ for the unit in the green band.

At a block 212, width (w) and gap (g) information is derived from calibration data received from the remote sensing system 104. Referring back to FIG. 2, width (w) and gap (g) information is shown relative to the green, blue, red, and NIR bands. At a block 214, the power of the pan band (i.e. power value in each unit of the pan band) is corrected using the power value for the corresponding unit in blue band, the sharpened power values for the corresponding units in the red, green, and NIR bands, and the derived width (w) and gap (g) information. EQUATION (4) below illustrates an exemplary formula for correcting the pan band power.

$$\begin{matrix} Pan \\ \text{Corrected} = \\ \text{Power} \end{matrix} \frac{\left[ (p2+p3+p4) \times 2 - p3 \times \left(\frac{g3v}{w3v} + \frac{g2v}{w3v}\right) - \\ p4 \times \left(\frac{g3v}{w4v}\right) - p2\left(\frac{g2v}{w2v} + \frac{g1v}{w2v}\right) - p1 \times \frac{g1v}{w1v} \right] \times}{(p2+p3+p4) \times 2} \quad (4)$$

Where
p1=multispectral power in band 1 (blue);
p2=multispectral power in band 2 (green);
p3=multispectral power in band 3 (red);

p4=multispectral power in band 4 (NIR);

p pan=multispectral power in band 8 (panchromatic);

w1v=difference between the wavelength lower limit for multispectral band 1 and the wavelength upper limit for multispectral band 1;

w2v=difference between the wavelength lower limit for multispectral band 2 and the wavelength upper limit for multispectral band 2;

w3v=difference between the wavelength lower limit for multispectral band 3 and the wavelength upper limit for multispectral band 3;

w4v=difference between the wavelength lower limit for multispectral band 4 and the wavelength upper limit for multispectral band 4;

g1v=difference between the wavelength lower limit for multispectral band 2 and the wavelength upper limit for multispectral band 1;

g2v=difference between the wavelength lower limit for multispectral band 3 and the wavelength upper limit for multispectral band 2; and g3v=difference between the wavelength lower limit for multispectral band 4 and the wavelength upper limit for multispectral band 3.

The pan correction equation (4) subtracts out average power values of the gaps from the total pan power.

If desired, the sharpened red, green, and NIR bands that are generated at the block 156 (FIG. 3) can be reinserted into the process 200 in order to further improve the pan band corrected power. The processes 150 and 200 proceed until all units in a sensed array have been processed. It will be appreciated that reinserting the sharpened values into the process 200 is an interactive process for refining the data and can be repeated as often as necessary.

Figure 5A:
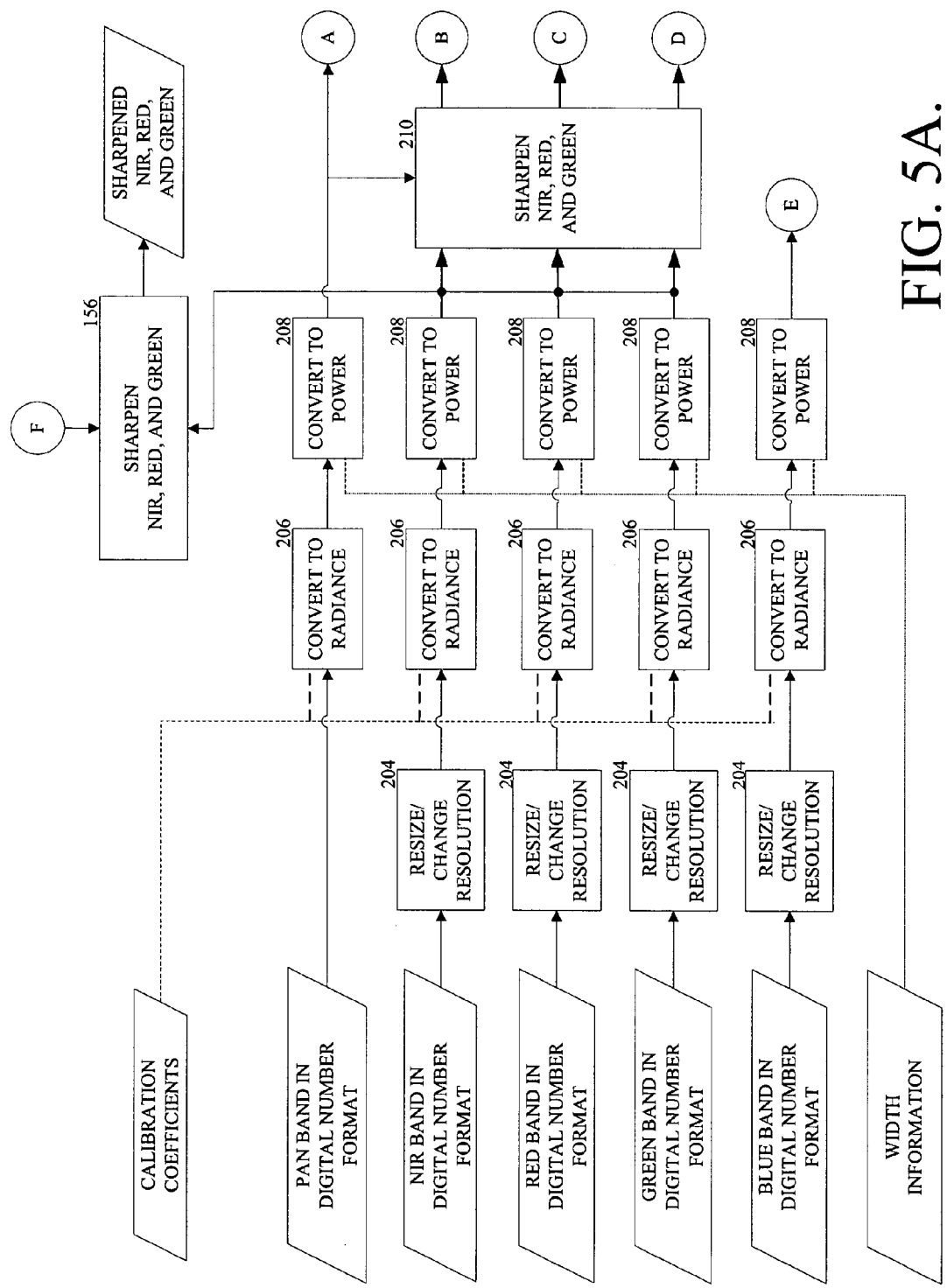
FIGS. 5A and 5B illustrate data progression with respect to the flow diagram of FIGS. 3 and 4.
Figure 5B:
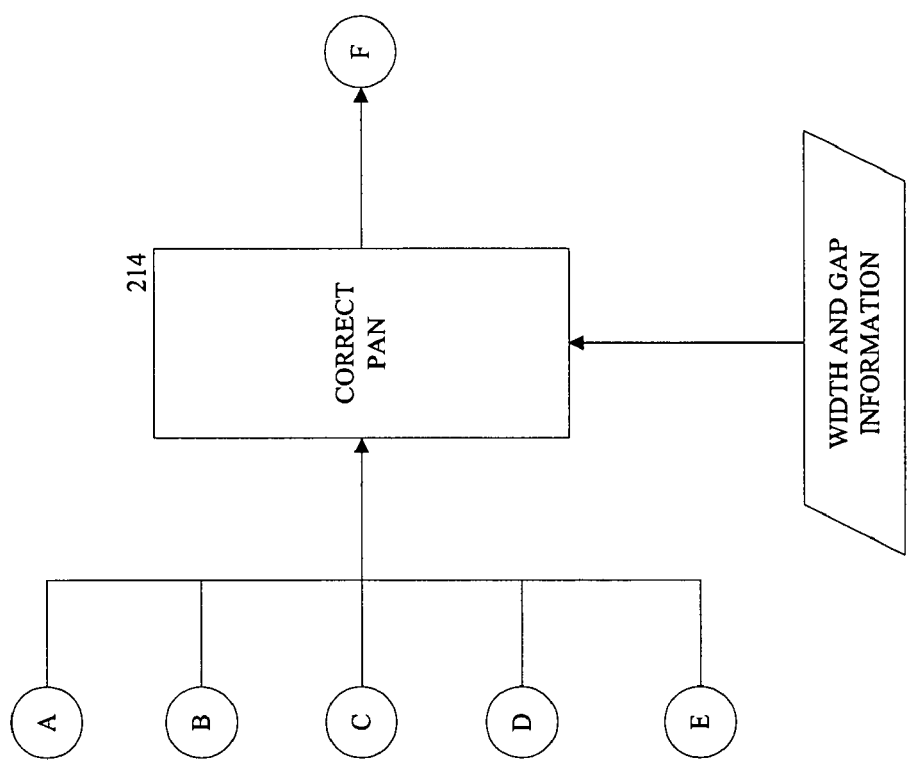

FIGS. 5A and 5B illustrate how the respective band data progresses through each of the steps of the processes 150 and 200. The process blocks are numbered the same as their corresponding blocks from FIGS. 3 and 4. Accordingly and for the sake of brevity and clarity, details of these process blocks need not be repeated for an understanding of the present invention.

It will be appreciated that the present invention can operate in real-time, thereby producing sharpened images at video speed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for sharpening one or more bands of sensor data, the method comprising:

receiving blue, green, red, near-infrared, and panchromatic bands of data;

converting the received blue, green, red, near-infrared, and panchromatic bands of data to power-format;

correcting data of the converted power-formatted panchromatic band based on the received blue, green, red, and near-infrared bands of data; and sharpening the data of one or more of the green, red, and near-infrared bands based on the corrected data of the panchromatic band.

2. The method of claim 1, further comprising combining the sharpened data of the green, red, and near-infrared bands with the received panchromatic band of data.

3. The method of claim 2, further comprising generating an image based on the combined data and displaying the generated image.

4. The method of claim 1, further comprising subtracting power of the corrected pan band from power of the original pan band to form a band of data.

5. The method of claim 1, wherein the blue, green, red, near-infrared, and panchromatic bands of data are generated by one of an aircraft or satellite sensing system.

6. A method for sharpening one or more bands of sensor data, the method comprising:

receiving blue, green, red, near-infrared, and panchromatic bands of data;

converting the received blue, green, red, near-infrared, and panchromatic bands of data to power-format;

sharpening the converted power-formatted data of the green, red, and near-infrared bands based on the received panchromatic band of data; and correcting the power-formatted data of the panchromatic band based on the sharpened power values for the data of the green, red, and near-infrared bands; and sharpening the data of one or more of the green, red, and near-infrared bands based on the corrected data of the panchromatic band.

7. The method of claim 6, wherein correcting the power-formatted data is further based on width and gap information of the blue, green, red, and near-infrared bands.

8. The method of claim 6, wherein correcting data of the panchromatic band further includes resizing the data of the blue, green, red, and near-infrared bands to match resolution of the data of the panchromatic band prior to converting the received blue, green, red, near-infrared, and panchromatic bands of data to the power-format.

9. The method of claim 6, wherein converting includes converting the data of the blue, green, red, and near-infrared bands into radiance values and converting the radiance values to the power-format.

10. The method of claim 9, wherein converting the radiance values to the power-format is based on upper and lower width limits of the blue, green, red, and near-infrared bands.

11. A computer-readable medium embodied with a computer program for sharpening one or more bands of sensor data in the visual spectrum, the computer-readable medium comprising:

first computer program code means for receiving blue, green, red, near-infrared, and panchromatic bands of data;

second computer program code means for converting the received blue, green, red, near-infrared, and panchromatic bands of data to power-format;

third computer program code means for correcting data of the panchromatic band based on the received blue, green, red, and near-infrared bands of data; and fourth computer program code means for sharpening the data of one or more of the green, red, and near-infrared bands based on the corrected data of the panchromatic band.

12. The computer-readable medium of claim 11, further comprising fifth computer program code means for combining the sharpened data of the green, red, and near-infrared bands with the received panchromatic band of data.

13. The computer-readable medium of claim 12, further comprising six computer program code means for generating an image based on the combined data and a means for displaying the generated image.

14. The computer-readable medium of claim 11, further comprising fifth computer program code means for subtracting power of the corrected pan band from power of the original pan band to form a band of data.

15. The computer-readable medium of claim 11, wherein the blue, green, red, near-infrared, and panchromatic bands of data are generated by one of an aircraft or satellite sensing system.

16. A computer-readable medium embodied with a computer program for sharpening one or more bands of sensor data in the visual spectrum, the computer-readable medium comprising:
   first computer program code means for receiving blue, green, red, near-infrared, and panchromatic bands of data;
   second computer program code means for converting the received blue, green, red, near-infrared, and panchromatic bands of data to power-format;
   third computer program code means for sharpening the converted power-formatted data of the green, red, and near-infrared bands based on the received panchromatic band of data;
   fourth computer program code means for correcting the power-formatted data of the panchromatic band based on the sharpened power values for the data of the green, red, and near-infrared band; and
   fifth computer program code means for sharpening the data of one or more of the green, red, and near-infrared bands based on the corrected data of the panchromatic band.

17. The computer-readable medium of claim 16, wherein the fourth computer program code means corrects the power-formatted data further based on width and gap information of the blue, green, red, and near-infrared bands.

18. The computer-readable medium of claim 16, wherein the fourth computer program code means further includes a sixth computer program code means for resizing the data of the blue, green, red, and near-infrared bands to match resolution of the data of the panchromatic band prior to converting the received blue, green, red, near-infrared, and panchromatic bands of data to power-format.

19. The computer-readable medium of claim 16, wherein the second computer program code means includes a sixth computer program code means for converting the data of the blue, green, red, near-infrared, and panchromatic bands into radiance values and a seventh computer program code means for converting the radiance values to the power-format.

20. The computer-readable medium of claim 19, wherein the second computer program code means converts the radiance values to the power-format based on upper and lower width limits of the bands.

21. A system for sharpening one or more bands of sensor data, the system comprising:
   a processor coupled to the input interface, the processor including:
      a first component configured to receive blue, green, red, near-infrared, and panchromatic bands of data; a second component configured to convert the received blue, green, red, near-infrared, and panchromatic bands of data to power-format;
      a third component configured to correct data of the panchromatic band based on the blue, green, red, and near-infrared bands of data;
      a fourth component configured to sharpen the data of one or more of the green, red, and near-infrared bands based on the corrected data of the panchromatic band;
      a fifth component configured to combine the sharpened data of the green, red, and near-infrared bands with the received panchromatic band of data; and
   a display device coupled to the processor configured to display an image based on the combined data.

22. The system of claim 21, wherein the processor includes a sixth component configured to subtract the corrected pan band power from original pan band power to form a band.

23. The system of claim 21, wherein the blue, green, red, near-infrared, and panchromatic bands of data are generated by one of an aircraft or satellite sensing system.

24. A system for sharpening one or more bands of sensor data, the system comprising:
   a processor coupled to the input interface, the processor including:
      a first component configured to receive blue, green, red, near-infrared, and panchromatic bands of data
      a second component configured to convert the received blue, green, red, near-infrared, and panchromatic bands of data to power-format;
      a third component configured to sharpen the converted power-formatted data of the green, red, and near-infrared bands based on the received panchromatic band of data; and
      a fourth component configured to correct the power-formatted data of the panchromatic band based on the sharpened power values for the data of the green, red, and near-infrared bands;
      a fifth component configured to sharpen the data of one or more of the green, red, and near-infrared bands based on the corrected data of the panchromatic band;
      a sixth component configured to combine the sharpened data of the green, red, and near-infrared bands with the received panchromatic band of data; and
   a display device coupled to the processor configured to display an image based on the combined data.

25. The system of claim 24, wherein the fourth component corrects the power-formatted data further based on width and gap information of the blue, green, red, and near-infrared bands.

26. The system of claim 24, wherein the fourth component further includes a seventh component configured to resize the data of the blue, green, red, and near-infrared bands to match resolution of the data of the panchromatic band prior to converting the received blue, green, red, near-infrared, and panchromatic bands of data to the power-format.

27. The system of claim 24, wherein the second component includes a seventh component configured to convert the data of blue, green, red, and near-infrared bands into radiance values and an eighth component configured to convert the radiance values to the power-format.

28. The system of claim 27, wherein the eighth component converts the radiance values to the power-format based on upper and lower width limits of the respective band.

29. A method for sharpening one or more bands of sensor data, the method comprising:
   receiving a plurality of first bands of data at a first resolution level, and a second band of data at a second resolution level, wherein the plurality of bands of data are included within the second band and the first resolution level is less than the second resolution level;

converting the first and second bands of data to power-format:

correcting data of the second band based on power values of the first and second bands of data; and sharpening the data of one or more of the plurality of first bands based on the corrected data of the second band.

30. A method for sharpening one or more bands of sensor data, the method comprising:

receiving a plurality of first bands of data at a first resolution level, and a second band of data at a second resolution level, wherein the plurality of bands of data are included within the second band and the first resolution level is less than the second resolution level;

converting the first and second bands of data to power-format;

correcting data of the second band based on power values of the first and second bands of data; and sharpening the data of one or more of the plurality of first bands based on the corrected data of the second band, wherein correcting includes:

determining power values for gaps between each of the plurality of first bands of data;

determining a total power value for the second band of data; and removing the determined power values for gaps between each of the plurality of first bands of data from the determined total power value for the second band of data.

31. A computer-readable medium embodied with a computer program for sharpening one or more bands of sensor data in the visual spectrum, the computer-readable medium comprising:

first computer program code means configured to receive a plurality of first bands of data at a first resolution level, and a second band of data at a second resolution level, wherein the plurality of bands of data are included within the second band and the first resolution level is less than the second resolution level;

second computer program code means configured to convert the first and second bands of data to power-format;

third computer program code means configured to correct data of the second band based on power values of the first and second bands of data; and fourth computer program code means configured to sharpen the data of one or more of the plurality of first bands based on the corrected data of the second band.

32. The computer-readable medium of claim 31, wherein the third computer program code means includes:

fifth computer program code means configured to determine power values for gaps between each of the plurality of first bands of data;

sixth computer program code means configured to determine a total power value for the second band of data; and seventh computer program code means configured to remove the determined power values for gaps between each of the plurality of first bands of data from the determined a total power value for the second band of data.

33. A system for sharpening one or more bands of sensor data, the system comprising:

a processor coupled to the input interface, the processor including:

a first component configured to receive a plurality of first bands of data at a first resolution level, and a second band of data at a second resolution level, wherein the plurality of bands of data are included within the second band and the first resolution level is less than the second resolution level;

a second component configured to convert the first and second bands of data to power-format;

a third component configured to correct data of the second band based on power values of the first and second bands of data;

a fourth component configured to sharpen the data of one or more of the plurality of first bands based on the corrected data of the second band; and a fifth component configured to combine the sharpened data with the second band of data;

a display device coupled to the processor configured to display an image based on the combined data.

* * * * *